United States Patent [19]
Hunt

[11] 3,731,273
[45] May 1, 1973

[54] POSITION LOCATING SYSTEMS
[76] Inventor: William E. Hunt, 2221 South Anchor, Anaheim, Calif. 92802
[22] Filed: Nov. 26, 1971
[21] Appl. No.: 202,361

[52] U.S. Cl. ..................... 340/16, 340/1, 178/18, 343/112 PT, 181/15 NP
[51] Int. Cl. .............................................. G01s 3/80
[58] Field of Search .................................. 340/1, 16; 178/18–20, 87; 343/112 PT; 181/15 NP

[56] References Cited
UNITED STATES PATENTS

| | | | |
|---|---|---|---|
| 3,156,766 | 11/1964 | Stamps | 340/16 R |
| 3,626,483 | 12/1971 | Whetstone et al. | 181/.5 NP |
| 3,504,334 | 3/1970 | Tornage | 340/16 R |
| 3,176,263 | 3/1965 | Douglas | 340/16 R |

Primary Examiner—Benjamin A. Borchelt
Assistant Examiner—N. Moskowitz
Attorney—Harvey C. Nienow et al.

[57] ABSTRACT

Position location and plotting is mechanized and accurately accomplished in a system employing a movable transmitter of acoustic signals and at least two acoustic receivers whose position is fixed. The system measures transit time from the transmitter to the receivers. It measures propagation velocity of the acoustic signal to determine distance from the transmitter to the two receivers and ultimately locates the transmitter's position relative to the two receivers. A signal of a kind that is more rapidly propagated than acoustic signals is generated simultaneously with initiation of the acoustic signal to form a start signal. Receipt of the acoustic signal at the receivers is made the occasion for generating a stop signal and the distance computation is made on the basis of the time interval elapsing between the start and stop signals. In the preferred embodiment the transmitter comprises a spark gap and the start signal is an electrical signal which is provided as an incident to current flow through the gap. A second spark gap, and means for developing a second start signal, has a fixed position relative to the two receivers. That arrangement is utilized to provide a high order of accuracy. To enhance accuracy even more, the two spark gaps are miniaturized and the structure for supplying energy currents to them and for developing start signals are made similar and the two systems are energized alternately from a common source. Special microphones receive acoustic signals at a known distance from a reference position whereby point-to-point distance and direction is accurately measured.

8 Claims, 7 Drawing Figures

Patented May 1, 1973

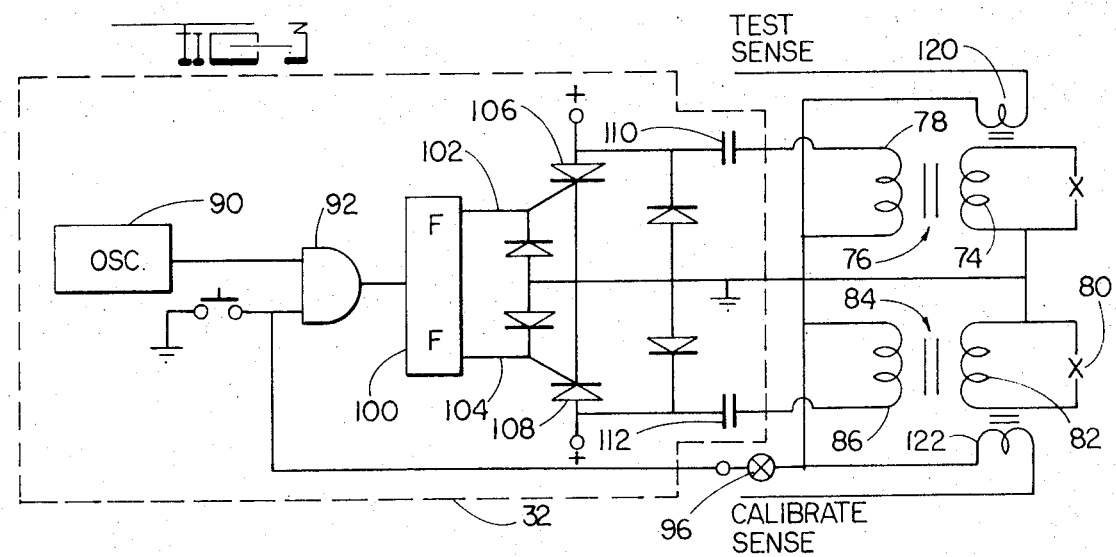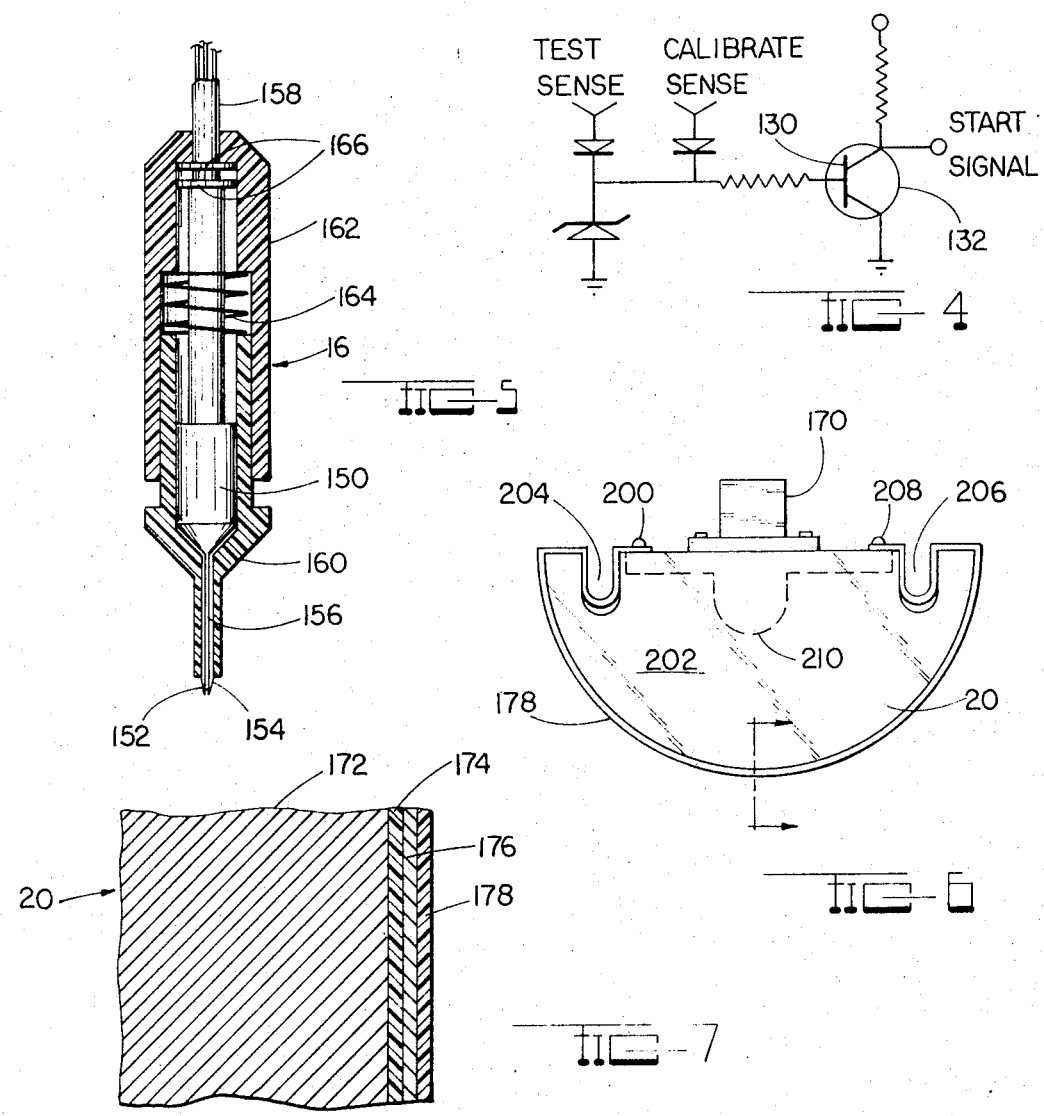

POSITION LOCATING SYSTEMS

This invention relates to improvements in position location systems.

There are a substantial number of instances in which it is desirable to describe quantitatively the relative position of objects whose position has previously been described qualitatively. For example, mere inspection of a map or aerial photograph will disclose whether one physical feature is located north, south, east or west of another; and it will disclose whether one physical feature is closer or farther than a second physical feature from a third feature. But to quantify that information it is necessary to measure and specify numerically the distance between such features and it may be necessary to specify numerically the direction in which one lies from the other. In another example, it is possible by mere inspection of some physical thing to understand what features account for its shape, whether one feature is larger or smaller than another and so on. However, if the task is to make a drawing of that physical thing, then it will be necessary to measure distances and directions between its various points. Many other examples could be given. An object of the invention is to provide a simplified means for making quantitative distance and position measurements in applications of this kind. Another object is to provide an apparatus that will make such measurements with a high degree of accuracy and which is relatively inexpensive and is convenient to use.

In the invention a test signal is radiated from a point, the position of which is to be quantified. The transit time of that test signal to transducers sensitive to the signal is measured. The transit time is then converted to units of distance and direction. In a preferred form of the invention, two signals are generated simultaneously. One of them, the slow signal previously mentioned, is created at the point whose location is to be quantified and the signal generated is one that has a relatively slow velocity of propagation. The other signal has a higher velocity of propagation or, alternatively, is located close to the signal utilization point. It is called the start signal. The end result must be that the start signal is recognized at the time that the test signal is initiated and begins its transit toward the pickup transducer at a remote detection point, whereby the transit time can be computed as the time between recognition of the start signal and the receipt of the test signal at remote detection points.

The preferred form of the invention employs two microphones as pickup transducers and a spark gap as a source of a slow audible signal and a start electrical signal. The spark gap is placed at a point whose position is to be quantified. The electrical impulse that gives rise to the spark is made to initiate operation of a timer. The spark makes an audible noise which radiates from the spark gap and travels at the velocity of sound. When the sound reaches a microphone the timing is stopped. Two microphones are employed in connection with two transit time measuring devices or systems. The transit time of the sound to each of the microphones determines the distance of the spark gap from that microphone. The use of two microphones provides information about the distance from the spark gap from each of them. Having that information, the point can be located by a process of triangulation.

Accuracy of the system is enhanced if the interval between creation of the start signal and arrival of the test signal is made relatively long. Acoustic signals are easily generated and detected. Electrical signals may be transmitted through wires at a speed approaching the speed of light. The combination of electrical and acoustic signals has proved to be very satisfactory. Light could be employed in the invention with the light generated by the spark but that refinement is ordinarily unnecessary. A very high degree of accuracy in determining start time is possible by using electrical start signals which are developed simultaneously with the flow of spark current that creates an acoustic signal. A special structure is employed in the preferred embodiment of the invention to insure that accuracy.

The spark gap generates the acoustic signal which is radiated toward the two microphones. Those microphones are specially structured in the preferred embodiment of the invention so that sounds impinging on them have arrived at a known distance from a point reference position. The dimensions of the spark gap structure may be made sufficiently small so that the spark can be considered to have been generated, and the acoustical signal can be considered to have emanated from, a single point. However, known microphone structures preclude the construction of a microphone so small that it can be considered to be a single point. The special construction employed in the preferred embodiment of the invention has the effect of locating a microphone at a single point in a three dimensional positioning system or on a single line in a two dimension position locating system.

In a further refinement, the preferred embodiment of the invention employs a calibration system formed by a second spark gap located at a known distance from the two microphones and means for measuring the transit time from that second spark gap to at least one of the microphones, and preferably both of them, so that the propagation velocity of sound can be computed and the velocity employed in calculating exactly the distance between the first or test spark gap and the microphones.

The preferred form of the system and of the microphone and of the spark gap structures is illustrated in the accompanying drawing. It is to be understood that other forms are possible and, in a given situation, may be preferable. Accordingly, the invention provides a method as well as a structure for accomplishing position locating. The method involves radiating a slowly propagated signal from a point whose position is to be determined, determining the time at which it is propagated, detecting the arrival of the signal at each of at least two spaced points, determining the time of arrival, finding the transit time of the signal from the point to be located and the sensing points, and converting that time to distance information. It is not essential, of course, to find the time of signal radiation and the time of its arrival and to subtract the first from the other. It is enough simply to determine the interval required for the signal to traverse the distance from the sending point to the receiving point. In the preferred method, another similar signal, traversing the same medium, is sent from a calibration point to the same microphones, and the same system is employed to compute the period required for the signal to traverse that distance whereby propagation velocity can be determined. It is preferred that the calibration signal be transmitted and the calibration computation be made periodically, preferably alternately with the test signal generation.

In the preferred method, the timing start signal is electrical and the test signal is acoustic having been generated in a spark gap. The start signal is derived by magnetic coupling to the circuit in which the spark current flows.

In the drawings:

FIG. 3 is a diagram of an apparatus of preferred form for generating test and calibrate signals and start signals;

FIG. 4 is a diagram of a circuit capable of processing a start signal from the apparatus of FIG. 3;

FIG. 5 is a view in vertical cross-section of a probe of preferred form;

FIG. 6 is a top plan view of a preferred form of microphone that is useful in the invention; and FIG. 7 is a cross-sectional view of a fragment of the microphone taken on line 7—7 of FIG. 6.

Figures 1, 2:
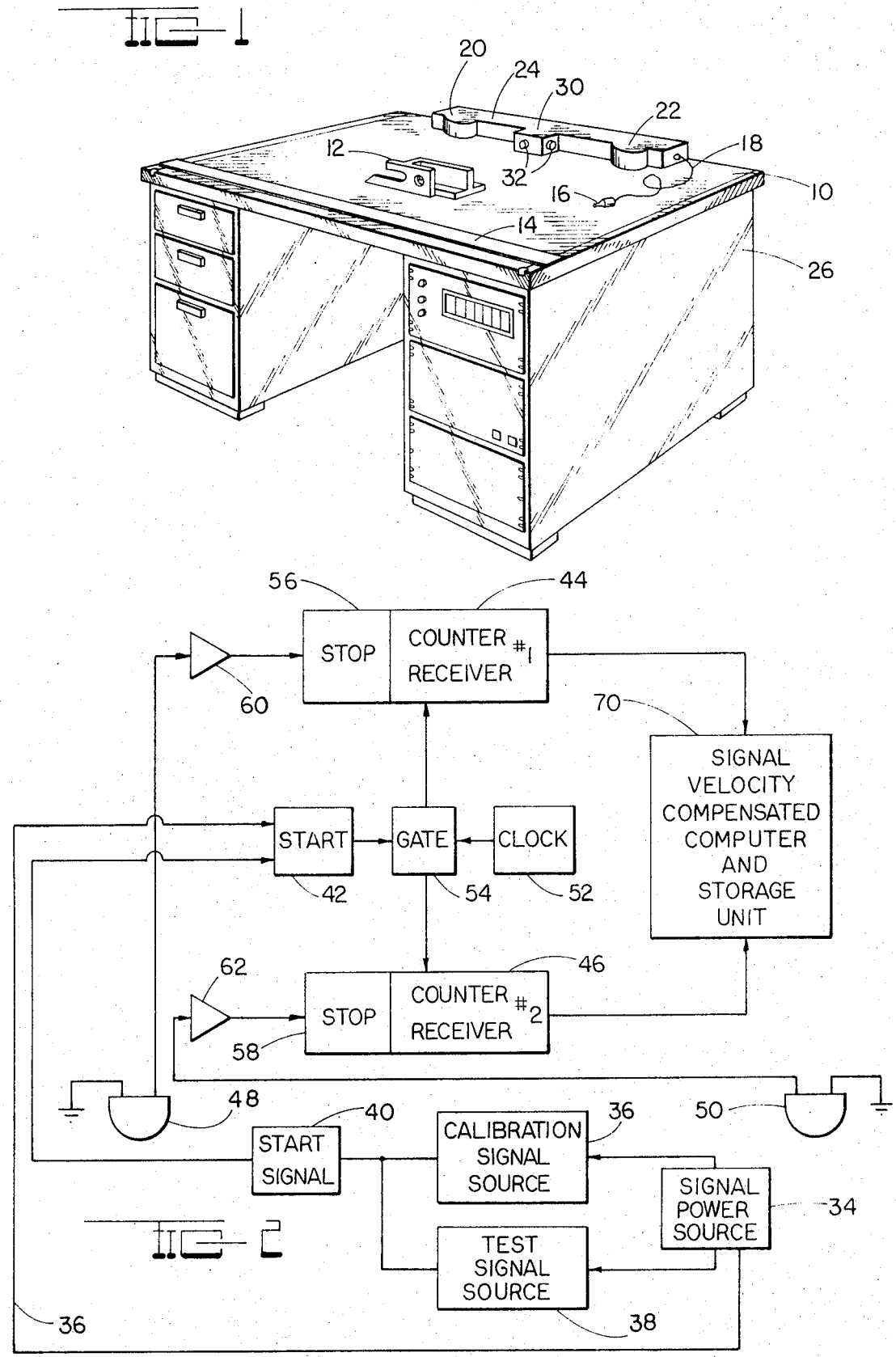
FIG. 1 is an isometric view of a measuring stand that incorporates an apparatus embodying the invention.
FIG. 2 is a block diagram of a system embodying the structure of the invention and operating according to the method of the invention.

The apparatus of FIG. 1 is designed primarily for use as a position plotting station where the positions occur in a single plane parallel to the upper working surface 10 of the unit. However, to some extent it can be used for locating the position of the several points on a three dimensional object. In the example situation being depicted in FIG. 1, it is required to inspect a manufactured part 12 by comparing the position of several points on the part against the position of corresponding points on a standard which was previously measured. A locating apparatus 14 that forms a part of the work station is used to place the part 12 exactly in the position previously occupied by a standard part to which the part 12 is to conform. The part having been located in the reference position as shown, the end of probe 16 is applied exactly at the points whose position is to be measured. The probe is constructed so that when its end is placed in the proper position a spark is generated. An electrical start signal that is generated simultaneously with the arc across the spark gap is transmitted by a cable 18 to apparatus where that signal is used to initiate two timing operations. The protrusions 20 and 22 that extend forwardly from the structure 24 at the rear of the work table are microphones. When the arc is struck at the end of probe 16, an acoustic signal is generated which radiates toward the microphones 20 and 22. When that signal arrives at microphone 20, one of the timing events is terminated and, when the acoustical signal arrives at the other microphone 22, the other of the timing events is terminated. Timing mechanism in the cabinet 26 below the table counts the transit time. That information is sent to a section of cabinet 26 which houses a computer which interprets the signals it receives from the microphone and the counting mechanism and computes direction and distance from the test point to the microphone. In this case the computer compares test position with the corresponding position of the reference workpiece. In that circumstance, where the transit time is simply compared with the previous transit time, it is not important that the acoustic signal may traverse the part being measured during part of its transit to the microphone or that the sound may take an alternate and longer path in which propagation velocity differs from velocity in air. The only question to be decided is whether the transit time was the same as it was when the reference piece was measured. Even in that situation, however, error might result because the propagation velocity through air and other materials varies from time to time with temperature and other physical phenomena. Accordingly, the apparatus includes provision for generating calibration signals at a position that has a known distance from the microphones 20 and 22. A spark gap and apparatus to power it and to provide a start signal which is substantially like that housed within the probe 16 is mounted on the table in the forwardly extending portion 30 of the structure 24. An adjusting mechanism controlled by knobs 32 permits exact positioning of that spark gap. The same apparatus, including the same microphones and the same timer and the same computer that are employed to determine transit times from probe 16 to the two microphones, is employed to determine transit times from the second spark gap inside the projection 30 to the two microphones 20 and 22. The distance being known, the computer can easily compute propagation velocity of the sound signal by well-known and understood means.

It will become apparent from explanation of this two dimension position-finding system that, by the addition of a third microphone and a third counter, the system can be made applicable to three dimensional position finding. True two dimensional operation is easy to envision. For example, if an aerial photograph was placed flat on the surface 10 and given some geographical direction orientation with the aid of the element 14, the position of various features illustrated on the photograph could be determined relative to one another or a reference point by placing the spark gap tip of the probe 16 directly over those features and over the reference point. With proper programming in the computer, computation of areas depicted in such a map and a wide variety of other tasks can be performed.

A diagram of a preferred system is illustrated in FIG. 2. Beginning at the lower right corner of that diagram, the numeral 32 designates a power source for the generation of the energy that is to be radiated from the calibration position and from the test position. Applied to FIG. 1, the signal power source 32 comprises the source of electrical energy that causes both the spark that gives rise to the acoustic signal and the start signal that are developed in the probe 16 and the calibration unit 30. Returning to FIG. 2, power from the source is applied to a calibration signal source 36 that corresponds to the unit 30 in FIG. 1. It is also applied to a test signal source 38 that corresponds to the probe 16 in FIG. 1. Signals emanating from signal sources 36 and 38 are used to develop a start signal in the functional box 40 marked START SIGNAL. In the example of FIG. 1, that start signal is advantageously generated in a circuit of the kind shown in FIG. 4. The output of the start signal unit 40 is applied to a functional block 42 marked START. That unit comprises an amplifier and wave shaping circuits and polarity changing circuits suitable to initiate counting in two digital counters 44 and 46. The system includes a clock 52 whose output is applied to the two counter unit 44 and 46. Pulses from the clock 52 are applied to both counters through a gate 54 when the gate is opened by a start signal at the output of start unit 42. Unit 42 responds to a signal from START SIGNAL unit 40 to keep the gate 54 open long enough to permit transit of the acoustic signal to the two receivers 48 and 50. Counting stops when a stop signal is applied by stop units 56 and 58 to counters 44 and 46, respectively. In simples form the two stop units 56 and 58 cooperate with a gate in their respectively associated counters and close the gate when a signal is received from their respectively associated receivers 48 and 50. The output of receiver 48 is applied to an amplifier 60 whose output is applied to stop unit 56. The other receiver 50 has its output applied to an amplifier 62 whose output is applied to the stop unit 58.

Signals from power source 34 are applied by a line 36 to the start unit 42. Control pulses applied by this line terminate the START SIGNAL that emanates from unit 42 to insure that the gate 54 is closed prior to the furnishing of each pulse of power to the calibration and test signal sources 36 and 38. The clock frequency and speed of system operation are such that the transit time of the acoustic signals is substantially shorter than the interval between successive applications of signal power to the two signal sources.

Clock 52, gate 54, counter 44, counter 46 and the three pulse formers 42, 56 and 58, and the two amplifiers 60 and 62 are conventional. They are within the ordinary skill of the art to provide and have not been shown in detail since their details form no part of the invention. The signal velocity compensator computer and storage unit 70 may comprise a conventional general purpose computer programmed to perform conventional mathematical operations and to compare signal transit times whereby calibration signals can be distinguished from test signals. It also comprises a storage unit in which the results of the computer's calculations can be stored along with the data on which those computations were made. As previously explained, the signal power source 34 is not conventional. An example is shown in FIG. 3. FIG. 3 also shows a calibration signal source and a test signal source which are preferred forms of the calibration and test signal sources 36 and 38. An example of the START SIGNAL unit 40 is diagrammed in FIG. 4. In the preferred form of the invention, the two receivers 48 and 50 are microphones of the kind shown in FIGS. 6 and 7.

Returning to FIG. 3, the spark gap 72 comprises part of the calibration signal source. Made portable, it becomes a means for generating an acoustic signal at the point at which the gap is placed when a spark traverses the gap. The gap is part of a secondary circuit that includes the secondary winding 74 of a transformer 76 whose primary winding 78 is connected to the signal power source 32. The calibration signal source is similar. It includes a spark gap 80 connected in a secondary circuit with the secondary winding 82 of a transformer 84 whose primary winding 86 is also connected to the signal power source 32. Source 32 includes a free running oscillator 90 whose output is applied to an AND gate 92. The other input of the gate is connected to ground through a normally open hand-operated switch 94 which is connected in parallel with a special switch 96. Switch 96 is closed when the probe, such as probe 16 of FIG. 1, is placed at a position whose measurements are to be taken. Closure of either of the switches 94 or 96 connects the second input of the gate 92 to ground and opens the gate so that signals from the oscillator 90 may be applied to the flip-flop 100 whose function is to apply an output pulse alternately to output lines 102 and 104. The flip-flop 100 is sensitive to the polarity of the input signal and it changes state when that polarity changes. Output signals on line 102 and 104 are applied to the triggers of respectively associated silicon controlled rectifiers 106 and 108. When the silicon controlled rectifier is rendered conductive, an associated capacitor 110 or 112 is discharged through the rectifier to ground. The discharge current traverses the primary windings of an associated one of the transformers 76 and 84. When that happens, a voltage is developed in the secondary windings of those transformers. When the voltage becomes sufficiently high, current flows in the secondary circuit and jumps the gap 72 or 80. Current flow in the secondary circuit is sensed through a magnetic coupling by a sensing coil 120 associated with gap 72 and a sensing coil 122 associated with gap 80. The currents developed in those coils 120 and 122 provide a test sense signal and a calibrate sense signal, respectively, which are applied at the test sense and calibrate sense inputs of the START SIGNAL circuit of FIG. 4. Summarizing operation of FIG. 3, the oscillator 90 is free running and its output is applied to one input of gate 92. When the test probe is applied to a point to be measured, a switch 96 is closed which completes a circuit from the other input of gate 92 to ground. The gate opens and oscillator output is applied to the flip-flop 100. That unit has two output terminals at which output pulses appear alternately at the frequency of oscillator 90. The output pulses from the flip-flop turn on one of two silicon rectifiers. A pulse on output line 102 turns on silicon rectifier 106. Previously the capacitor 110 had been charged from the plus terminal at one side of that capacitor to ground at the other side of the capacitor through primary winding 78 of transformer 76. When the silicon controlled rectifier 106 is fired, that capacitor discharges causing a current flow in winding 78. By induction a voltage is developed across winding 74. When that voltage has reached a sufficient magnitude, air in the gap 72 will break down and current will flow in the secondary circuit comprising secondary winding 74, gap 72 and the leads that interconnect them. Magnetically coupled to that secondary circuit is the coil 120, one side of which is connected to ground and the other side of which is connected to one input of the START SIGNAL unit shown in FIG. 4.

The calibrate signal generating portion of FIG. 3 is like the test signal generating portion. Its coil 122 has one side connected to ground and the other side connected to the other input of the start signal unit of FIG. 4. Current flow in winding 120 or 122 will result in application of a voltage to the base 130 of transistor 132 in FIG. 4. The transistor is turned on and a start signal generated at the terminal marked START SIGNAL. The several rectifiers in FIG. 3 and FIG. 4 simply limit the direction of current flow they and the Zener diode limit the voltages that can be developed across the several elements of the circuit.

Transformer 76 and coil 120 are housed in probe 16 of FIG. 1. That probe may, and in this embodiment does, have the form illustrated in FIG. 5. The transformer is wound on a toroidal core and is incapsulated in the section designated 150. The two leads 152 and 154 that protrude from the point of the probe are separated by an insulator 156 for mose of their length. However, at their ends, the two leads become very small and are closely spaced. That spacing forms the spark gap 72 in FIG. 3. The several wires that interconnect the probe with the rest of the system are housed in a cable 158 that enters the probe at the other end. The probe housing comprises a lower part 160 and an upper part 162. They are normally held apart by a bias spring 164 which is easily overcome by downward pressure on the housing part 162 when the end of the probe, the spark gap, has been placed at the position in which a measurement is to be made. When the upper part of the housing moves downwardly, a pair of contacts 166 is closed. One contact is carried by the portion 162 of the housing and the other contact is carried by a structure that is fixed to the lower part 160 of the housing. Contacts 166 comprise switch 96 in FIG. 3.

The preferred signal receiver is a microphone of the capacitor variety whose acoustic signal sensitive elements extend over a surface all part of which are equidistant from a point, inaa three dimensional system, or from a line in a two dimensional system. The location of a point is defined as the distance and direction from the test probe spark gap to the reference point or reference line of the microphone. The length of the microphone surface depends upon the range of test probe positions that is to be permitted. If the two microphones are mounted at one edge of the field of possible probe positions in the manner illustrated in FIG. 1, then the microphone surface should be a segment of a circle at least 90° long if the field is confined to regions between the two microphones. The surface should approach 180° of the field is broader. The microphones could be placed instead on different edges of the field of possible probe position and in that case a different length of microphone surface might be desirable. The requirement is that the microphone surface be sufficiently long so that it is interposed between the reference point or line associated with that microphone and any permissible position of the test probe 16.

The unit in FIG. 6 is the microphone 20 of FIG. 1. It is semi-circular in top and bottom plan view and its upper and lower faces are parallel and lie in planes normal to the axis of the unit. The axis serves as the reference line for the microphone. The working elements of the microphone are placed at the outer periphery of the unit and they are shown in section in FIG. 7. The body of the unit is essentially solid although it includes recesses and cut-outs for mounting screws, locating pins and electrical conductors which lead to a connector 170 at the rear of the microphone. In FIG. 7 the body is numbered 172 and it is made of a metallic, electrically conductive material. A dielectric material is applied to the outer semi-cylindrical face of the body. The dielectric layer is identified by the numeral 174. That layer is easily compressible. Overlying it is a very thin metallic layer 176 which is so easily deformed that sound waves impinging on it cause it to compress the layer 174 slightly and alter the thickness of the dielectric layer to the end that the capacitance exhibited by the unit is altered. A very thin non-conductive outer coating 178 protects the metallic layer 176. It is made of a hard relatively incompressible material so that sound pressure waves are transmitted efficiently to the metallic layer 176.

The microphone of FIGS. 6 and 7 is especially useful. It has a very broad frequency response and is inexpensive to produce. Its geometry simplifies the task of making its response directional whereby to minimize response to ambient noise although that is not a major problem. The system makes its measurements rapidly and repeatedly as long as the probe switch is closed so the computer can recognize and reject false readings occasioned by noise.

In FIG. 7 the layers 174 and 176 may, and in this case they are, formed as a metalized mylar plastic strip that extends from a fastener 200 at the rear of aluminum body 202, through a recess 204 then around the semi-circular front of the body to the rear at the opposite side of connector 170 where it extends into a recess 206 and thence to a fastener 208 at its opposite end. The dashed line 210 represents other recesses in which conductors are housed that connect to the metalized surface of the mylar. In this embodiment the outer layer 178 is a thin sprayed-on coating of hard electrical varnish.

Although I have shown and described certain specific embodiments of my invention, I am fully aware that many modifications thereof are possible. My invention, therefore, is not to be restricted except insofar as is necessitated by the prior art.

I claim:

1. In a position indicator, in combination:

a pair of spaced microphones;

a first spark gap movable relative to said microphones;

first energizing means for causing application of electrical energy to said gap sufficient to form a spark current and, as an incident thereto, to radiate an acoustic test signal from the gap;

first start signal means for providing an electrical start signal simultaneously with formation of the spark; and timing means responsive to said electrical start signal to begin counting time and responsive to receipt of acoustic test signal at said microphones to determine transit time of test signal to each of said microphones;

said energizing means comprising a source of electrical power pulses; a transformer having a primary winding connected to the source and a secondary winding connected across the gap; said first start signal means comprising a coil inductively coupled to the circuit comprised by said secondary winding and said gap.

2. The invention defined in claim 1 which further comprises a second spark gap having known fixed spacing from said microphones; and second energizing means similar to said first energizing means for causing sparks to traverse said second spark gap, and second start signal means similar to said first start signal means for providing a second start signal.

3. The invention defined in claim 2 in which said first and second energizing means are operative to cause said first and second spark gaps to spark alternately.

4. The invention defined in claim 2 in which said position indicator further comprises means responsive to the start signal and the acoustic signal provided and radiated from said second spark gap for computing acoustic signal velocity, and comprises means responsive to the start signal generated by said start signal means and the reception at said microphones of acoustic signals from said first spark gap, and to said computation of acoustic signal velocity for providing signals indicative of the distance from each microphone to said first spark gap.

5. In a position indicator, in combination:
a pair of spaced microphones;
a first spark gap movable relative to said microphones;
first energizing means for causing application of electrical energy to said gap sufficient to form a spark current and, as an incident thereto, to radiate an acoustic test signal from the gap;
first start signal means for providing an electrical start signal simultaneously with formation of the spark;
timing means responsive to said electrical start signal to begin counting time and responsive to receipt of acoustic test signal at said microphones to determine transit time of test signal to each of said microphones;
said microphones comprising a compression sensitive capacitor formed by two metallic surfaces separated by an insulating dielectric, the surfaces being everywhere equidistant from a respectively associated reference point lying on the side opposite said metallic surfaces from the positions at which said first spark gap may be placed; and
a second spark gap having a fixed position relative to the reference points associated with said microphones and calibration signal generating means causing a spark to traverse said second gap to generate a second electrical start signal and to radiate calibration acoustic signals.

6. The invention defined in claim 5 in which said first energizing means and said calibration signal generating means both comprise a source of electrical energy pulses, a transformer having its primary winding connected to said source and a secondary winding connected in a secondary circuit in series with its associated spark gap, said first start signal means and said calibration signal generating means each comprising means for providing an electrical signal simultaneously with current flow in the respectively associated one of said secondary circuits.

7. The invention defined in claim 6 in which said transformer of said first energizing means and said first start signal means are housed together with said first spark gap in a movable probe;
said first energizing means comprising a switch operative to initiate application of electrical energy pulses to both of said transformers, said switch be housed in said probe.

8. The invention defined in claim 7 in which said switch is operative in response to placement of the probe at selected points.

* * * * *